(12) United States Patent
Yeo et al.

(10) Patent No.: US 8,951,085 B2
(45) Date of Patent: Feb. 10, 2015

(54) METHOD OF FABRICATING FLEXIBLE DISPLAY DEVICE

(71) Applicant: LG Display Co., Ltd., Seoul (KR)

(72) Inventors: JunHo Yeo, Gyeonggi-do (KR); SungJin Park, Gyeongsangbuk-do (KR); SeungMin Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/023,700

(22) Filed: Sep. 11, 2013

(65) Prior Publication Data

US 2014/0134913 A1 May 15, 2014

(30) Foreign Application Priority Data

Nov. 14, 2012 (KR) ........................ 10-2012-0129078

(51) Int. Cl.
*H01J 9/00* (2006.01)
*G02F 1/1333* (2006.01)

(52) U.S. Cl.
CPC ........ *G02F 1/1333* (2013.01); *G02F 1/133305* (2013.01); *G02F 2001/133354* (2013.01)
USPC ........................................... 445/24; 428/40.1

(58) Field of Classification Search
USPC ............................................ 445/24; 428/40.1
See application file for complete search history.

(56) References Cited

U.S. PATENT DOCUMENTS

2013/0273292 A1* 10/2013 Kim et al. ..................... 428/40.1

* cited by examiner

*Primary Examiner* — Mary Ellen Bowman
(74) *Attorney, Agent, or Firm* — Morgan, Lewis & Bockius LLP (57) ABSTRACT

A method of fabricating a flexible display device is to prevent damage due to a defective detachment of an auxiliary substrate by carrying out the detachment in a manner of irradiating lasers onto a sacrifice layer interposed between a flexible substrate and an auxiliary substrate and thereafter taking away a vacuum by injecting air into the interface between the flexible substrate and the auxiliary substrate. The fabricating method includes providing an auxiliary substrate, forming a sacrifice layer on the auxiliary substrate, forming a flexible substrate on the auxiliary substrate with the sacrifice layer formed thereon, forming a display panel on the flexible substrate, removing the sacrifice layer interposed between the flexible substrate and the auxiliary substrate by way of a laser irradiation, injecting air between the flexible substrate and the auxiliary substrate removed the sacrifice layer therebetween, and detaching the auxiliary substrate from the flexible substrate.

14 Claims, 6 Drawing Sheets

METHOD OF FABRICATING FLEXIBLE DISPLAY DEVICE

CROSS-REFERENCE TO RELATED APPLICATION

Pursuant to 35 U.S.C. §119(a), this application claims the benefit of earlier filing date and right of priority to Korean Application No. 10-2012-0129078, filed on Nov. 14, 2012, the contents of which is incorporated by reference herein in its entirety.

BACKGROUND OF THE DISCLOSURE

1. Field of the Disclosure

This specification relates to a method of fabricating a flexible display device, and particularly, to a method of fabricating a flexible display device, capable of easily detaching an auxiliary substrate from a process-completed flexible substrate.

2. Background of the Disclosure

In recent information-oriented societies, importance of display devices as visual information transfer media is urged. To dominate an important position later, such display devices have to meet several conditions, such as low power consumption, size reduction, weight reduction and enhancement of image quality.

The display devices may be classified into light-emitting type display devices including a cathode ray tube (CRT), an electroluminescence (EL), a light emitting diode (LED), a vacuum fluorescent display (VFD), an organic light emitting device (OLED), a field emission display (FED), a plasma display panel (PDP), an electrophoresis display device, and light non-emitting type display devices such as a liquid crystal display (LCD).

A flexible display device which is not damaged even if it is folded or rolled up is expected to be highlighted as a new technology in the display device field. Many obstacles are existing in implementing the flexible display device at present, but a thin film transistor (TFT) LCD device, an OLED device or an electrophoresis display device will be the mainstream display device, with development of technologies.

A flexible display device is called as a scroll display device. The flexible display device is implemented on a thin substrate such as plastic. The flexible display device is not damaged even if being folded or rolled up like a paper, and thus it is considered as one of next generation display devices. LCD devices and OLED devices which can be made thin less than 1 mm are promising display devices at present.

The LCD device is a device for outputting an image using optical anisotropy of liquid crystal molecules. The LCD device exhibits higher visibility than the conventional CRT, and less average power consumption and less heat radiation than the CRT with the same screen size. Accordingly, the LCD device is under the limelight as the next generation display device.

The OLED device can emit light by itself, and accordingly exhibits high visibility even when it is used in a dark place or external light is shone and has the fastest response rate, which is an important reference for determining a performance of a mobile display device, among all existing display devices. Accordingly, the OLED device can implement perfect videos. Also, the OLED device can be designed into a ultrathin shape, which may allow various types of mobile devices, such as mobile phones, to be slimmer.

To implement the flexible display device, flexibility of a substrate has to be ensured. To ensure the substrate flexibility, a flexible substrate made of plastic or stainless steel (SUS) is being used instead of the conventional glass substrate.

As such, the flexible substrate such as the plastic substrate has to be used to implement the flexible display device. To convey the flexible substrate and carry out a series of processes, those processes are generally executed after attaching the plastic substrate onto a glass substrate using an adhesive. Due to the complicated attachment (adhesion) process and a plurality of lamination processes, defective devices and lowering of productivity may be caused.

That is, to attach the plastic substrate onto the glass substrate, a complicated adhesion process, such as removal of a lower release paper of an adhesive, lamination of the adhesive, removal of an upper release paper of the adhesive, lamination of the plastic substrate, and the like have to be sequentially carried out. Also, it is highly likely to cause a process error (defect), such as generating bubbles and spots during the lamination process. Specifically, the complicated adhesion process results in lowering of productivity.

When the plastic substrate adhered onto the glass substrate is conveyed in the adhered state and then fabrication of a display panel is completed through several processes, a process of separating (detaching) the glass substrate from the plastic substrate as a display panel is carried out.

Here, to detach the plastic substrate from the adhesive attached on the glass substrate, several conditions have to be met depending on the detachment process. Also, since the adhesive is attached on an entire front surface of the glass substrate, the detachment is not easy.

In recent time, a display panel is formed by executing processes after interposing a sacrifice layer between the plastic substrate and the glass substrate and then the glass substrate is separated from the plastic substrate by applying a laser release. Upon the laser release, a vacuum is formed between the plastic substrate and the glass substrate, which makes it difficult to separate the glass substrate. In this case, an impact may be applied to the display panel including the plastic substrate, which may cause a damage of the flexible display device.

SUMMARY OF THE DISCLOSURE

Therefore, to overcome the drawbacks of the related art, an aspect of the detailed description is to provide a method of fabricating a flexible display device capable of easily detaching an auxiliary substrate from a process-completed flexible substrate.

Other aspects and features of the present disclosure will be described in the mode of the disclosure and claims of the present disclosure disclosed herein.

To achieve these and other advantages and in accordance with the purpose of this specification, as embodied and broadly described herein, there is provided a method of fabricating a flexible display device including providing an auxiliary substrate, forming a sacrifice layer on the auxiliary substrate, forming a flexible substrate on the auxiliary substrate with the sacrifice layer formed thereon, forming a display panel on the flexible substrate, removing the sacrifice layer interposed between the flexible substrate and the auxiliary substrate by way of a laser irradiation, injecting air between the flexible substrate and the auxiliary substrate removed the sacrifice layer therebetween, and detaching the auxiliary substrate from the flexible substrate.

Here, the auxiliary substrate may be implemented as a glass substrate or a metal substrate.

The flexible substrate may be formed by coating polyimide-based resin on the sacrifice layer.

The display panel may be implemented as one of a liquid crystal display (LCD) device, an organic light emitting diode (OLED) device or an electrophoresis display device.

The method may further include, after forming the display panel on the flexible substrate, loading the flexible substrate onto a vacuum stage with the auxiliary substrate being turned over to face an upper side.

Here, the sacrifice layer interposed between the flexible substrate and the auxiliary substrate may be removed by irradiating lasers onto the auxiliary substrate.

The laser irradiation and the detachment of the auxiliary substrate may be carried out on the same vacuum stage.

The auxiliary substrate may be detached from the flexible substrate using a vacuum pad unit.

Here, the vacuum pad unit may include a plurality of vacuum pads and a vacuum pad plate to move the vacuum pads up and down.

The air may be injected through an air injector provided at the vacuum pad unit.

The air injection may be carried out after adsorbing and fixing an upper surface of the auxiliary substrate using the vacuum pads of the vacuum pad unit.

The detachment of the auxiliary substrate may be facilitated by injecting air to change a vacuum adhesion force of the interface between the flexible substrate and the auxiliary substrate into pressure over atmospheric pressure.

Here, the auxiliary substrate may be detached from the flexible substrate using the vacuum pad unit after a vacuum between the flexible substrate and the auxiliary substrate is taken away by the air injection.

The auxiliary substrate may be detached from the flexible substrate by moving the vacuum pad unit upwardly with maintaining a horizontal state.

A method of fabricating a flexible display device may provide an effect of preventing damage due to a defective detachment by carrying out the detachment in a manner of irradiating lasers onto a sacrifice layer interposed between a flexible substrate and an auxiliary substrate and thereafter taking away a vacuum by injecting air into the interface between the flexible substrate and the auxiliary substrate.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

A method of fabricating a flexible display device according to an exemplary embodiment of the present disclosure will now be described with reference to the accompanying drawings, such that those skilled in the art to which the present disclosure belongs can easily practice it.

Advantages and features of the present disclosure and methods for achieving those will be obviously understood by the following exemplary embodiments described in detail with reference to the accompanying drawings. However, the present disclosure is not to be construed as being limited to the exemplary embodiments but can be implemented into various forms. The exemplary embodiments of the present disclosure are merely illustrated to fully describe the present disclosure and provided to help a skilled person in the art to understand the scope of the present disclosure. The present disclosure is merely defined by the claims. The same/like reference symbols or numerals over the specification refer to the same/like components.

Figure 1:
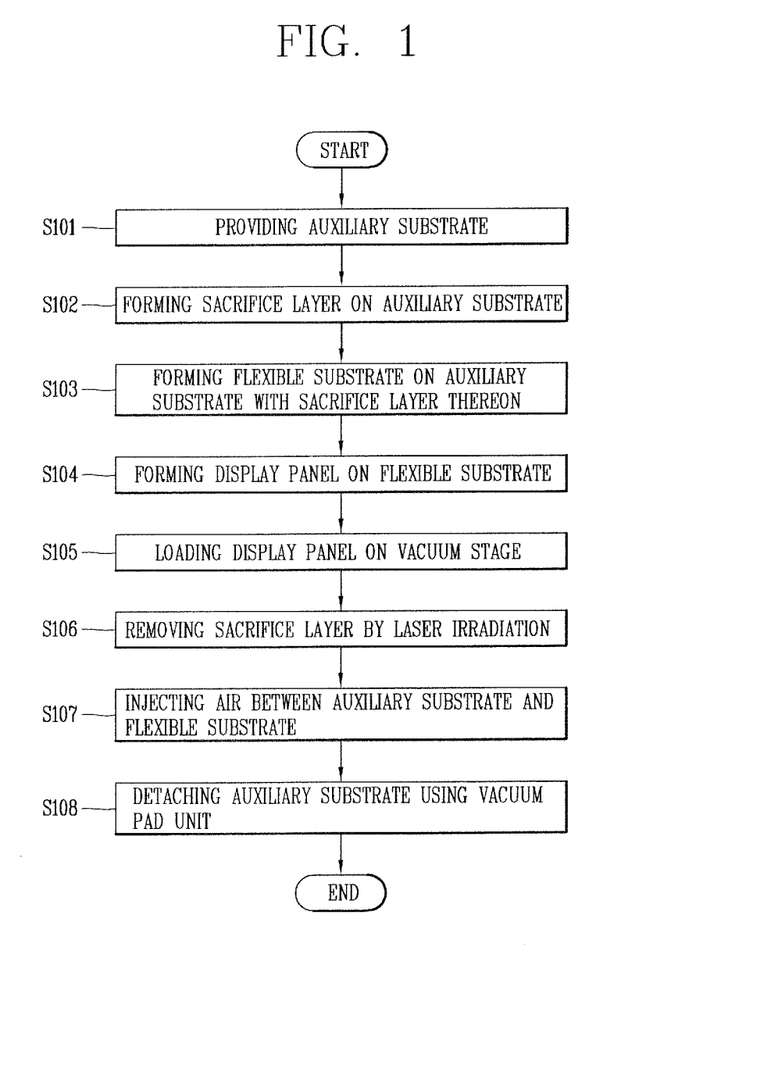
FIG. 1 is a flowchart sequentially showing a method of fabricating a flexible display device in accordance with an exemplary embodiment of the present disclosure.

FIG. 1 is a flowchart sequentially showing a method of fabricating a flexible display device in accordance with an exemplary embodiment of the present disclosure.

Also, FIGS. 2A to 2G are perspective views sequentially showing the method of fabricating the flexible display device in accordance with the exemplary embodiment of the present disclosure.

FIGS. 3A to 3D are sectional views sequentially showing a detachment process of an auxiliary substrate in the method of fabricating the flexible display device shown in FIG. 1.

Figure 2A:
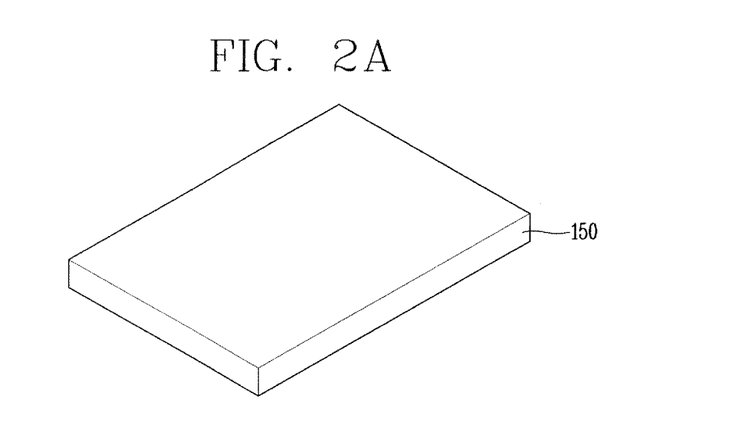
FIGS. 2A to 2G are perspective views sequentially showing the method of fabricating the flexible display device in accordance with the exemplary embodiment of the present disclosure.

As shown in FIG. 2A, to fabricating a flexible display device in accordance an exemplary embodiment of the present disclosure, an auxiliary substrate 150 may be provided (S101).

Here, the auxiliary substrate 150 may support a flexible substrate 110 (see FIG. 2C) during a display panel process which will be explained later. Here, the auxiliary substrate 150 may be implemented as a glass substrate or a metal substrate.

Figure 2B:
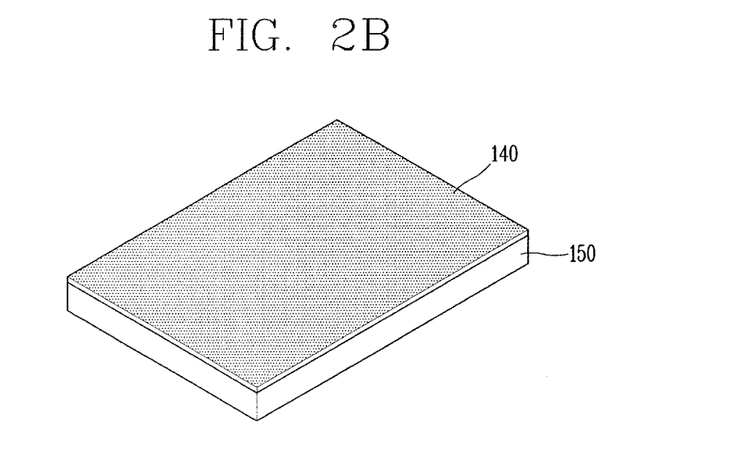

Afterwards, referring to FIG. 2B, a sacrifice layer 140 may be formed on a surface of the auxiliary substrate 150 (S102).

Here, the sacrifice layer 140 may secure the flexible substrate 110 which is to be formed on the auxiliary substrate 150 during the display panel process.

Figure 2C:
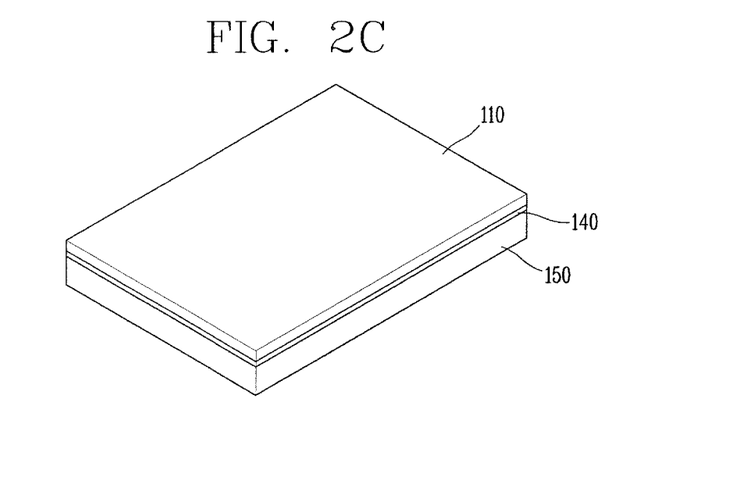

Referring to FIG. 2C, the flexible substrate 110 may be formed on the auxiliary substrate 150 with the sacrifice layer 140 formed thereon (S103).

Here, the flexible substrate 110 may be formed, for example, by coating polyimide-based resin on the sacrifice layer 140. Here, the present disclosure may not be limited to the type of resin. The flexible substrate 110 may be attached (adhered) onto the auxiliary substrate 150 with the sacrifice layer 140 formed thereon.

Figure 2D:
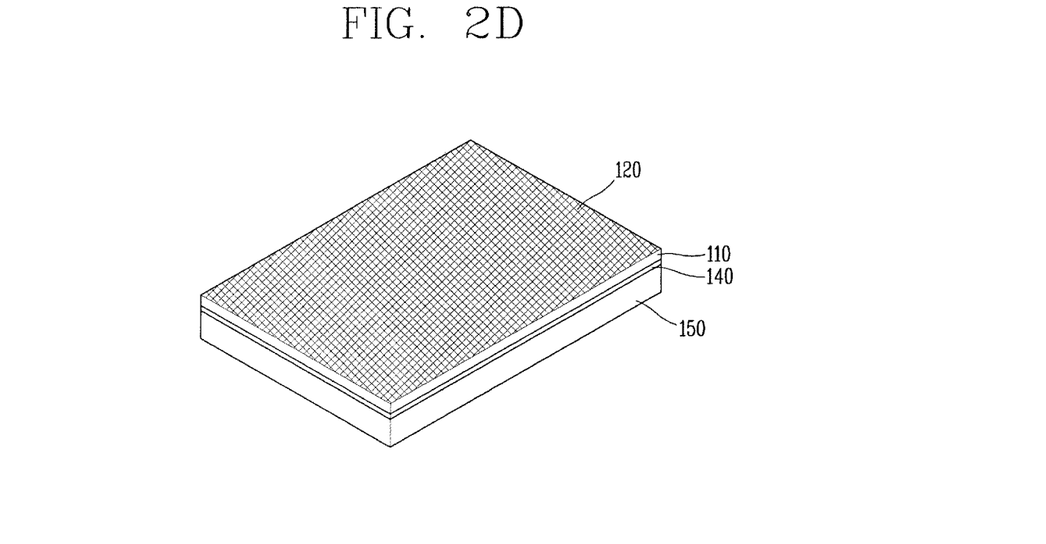

Referring to FIG. 2D, a display panel 120 may be formed on the flexible substrate 110 (S104).

Here, the display panel 120 may be one of an LCD device, an OLED device or an electrophoresis display device.

Figure 4:
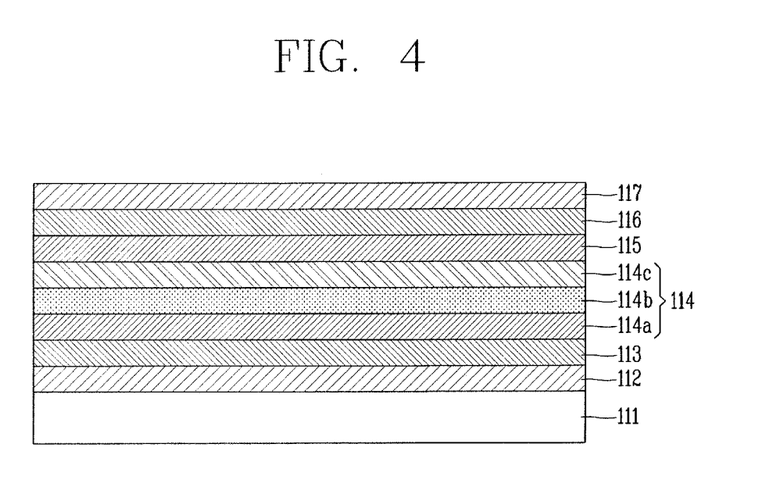
FIG. 4 is a sectional view exemplarily showing a structure of a flexible display device in accordance with an exemplary embodiment of the present disclosure.

FIG. 4 is a sectional view exemplarily showing a structure of a flexible display device in accordance with an exemplary embodiment of the present disclosure, which shows an OLED device as an example of the display panel.

When the display panel 120 is implemented as the OLED device, as shown in FIG. 5, an anode 112 made of transparent oxide may be formed on a substrate which is made of plastic or stainless steel. On the anode 112 may be sequentially formed a hole transport layer 113, an emission layer 114, an electron transport layer 115, an electron injection layer 116 and a cathode 117.

Here, when a substrate 111 is made of a polyimide (PI)-based material, a back film, which is made of plastic such as polyethylene terephthalate (PET) or a metal such as stainless steel, may be attached on a rear surface of the substrate 111.

In the OLED device having the structure, holes injected from the anode 112 and electrons injected from the cathode 117 may be coupled to each other on the emission layer 114 via the transport layers 113 and 115 for transport of the holes and electrons, respectively, and moved to a lower energy level, so as to generate light of wavelength corresponding to an energy difference on the emission layer 114.

Here, in order to emit white light, the emission layer 114 may include, in more detail, a red light emission layer 114a, a green light emission layer 114b and a blue light emission layer 114c.

On the other hand, when the display panel 120 is implemented as the LCD device, although not shown, the display panel 120 may include two sheets of substrates and a liquid crystal layer interposed between the substrates.

Here, a thin film transistor (TFT) array may be formed on a lower substrate. The TFT array may include a plurality of data lines to which R, G and B data voltages are supplied, a plurality of gate lines intersecting with the data lines and having gate pulses supplied thereto, a plurality of TFTs formed on intersections between the data lines and the gate lines, a plurality of pixel electrodes to charge a data voltage to liquid crystal cells, storage capacitors connected to the pixel electrodes to maintain the voltages of the liquid crystal cells, and the like. A color filter array may be formed on an upper substrate. The color filter array may include a black matrix, a color filter and the like.

Here, the sacrifice layer 140 and the flexible substrate 110 may be made of the polyimide-based resin, which has durability at high temperature, for example, over 400° C. This may prevent the sacrifice layer 140 and the flexible substrate 110 from being deformed or damaged even if being exposed to a process environment of forming the display panel 120.

Referring to FIGS. 2E to 2G and FIGS. 3A to 3D, the auxiliary substrate 150 may be detached from the flexible substrate 110 on which the display panel 120 has been formed.

Figure 3A:
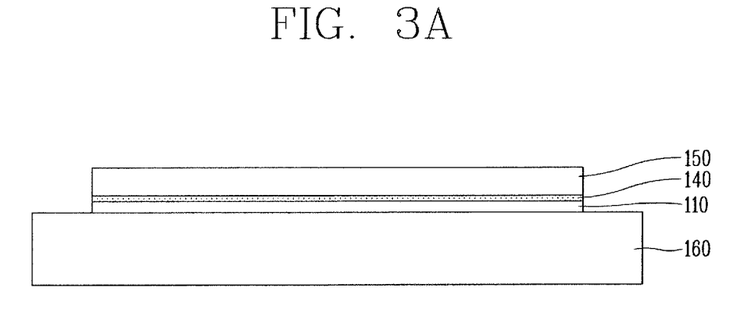
FIGS. 3A to 3D are sectional views sequentially showing a detachment process of an auxiliary substrate in the method of fabricating the flexible display device shown in FIG. 1.

In detail, referring to FIG. 3A, after the flexible substrate 110 having the display panel 120 formed thereon is turned over such that the auxiliary substrate 150 faces an upper side, the flexible substrate 110 and the auxiliary substrate 150 may be loaded onto a vacuum stage 160 (S105). Here, the present disclosure may not be limited to this. The flexible substrate 110 and the auxiliary substrate 150 may be loaded onto the vacuum stage 160 without being turned over.

Here, the vacuum stage 160 may include a plurality of vacuum holes (not shown) to adsorb and fix the loaded flexible substrate 110.

Figure 2E:
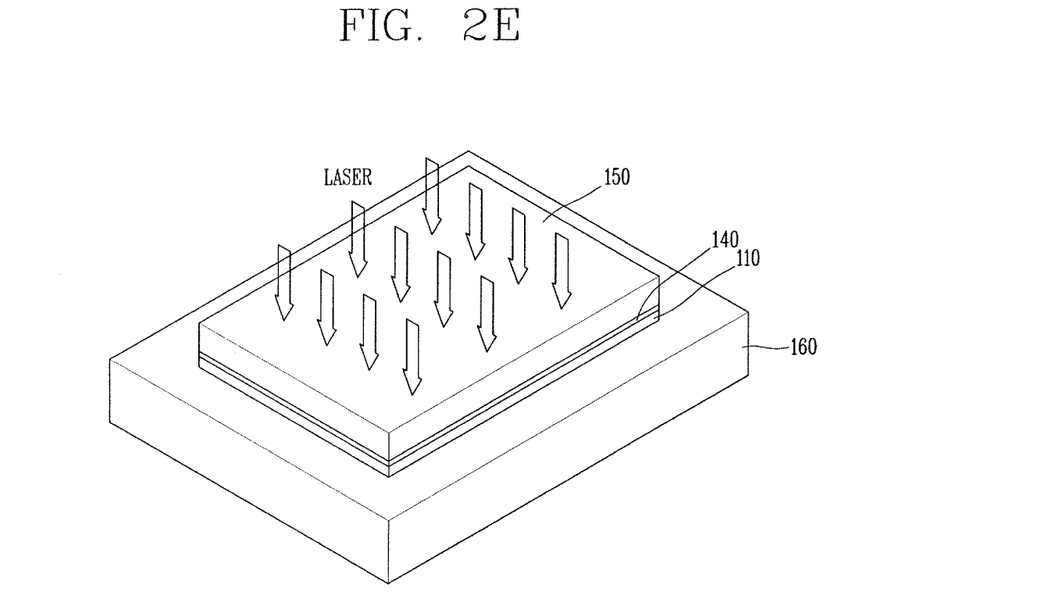
Figure 3B:
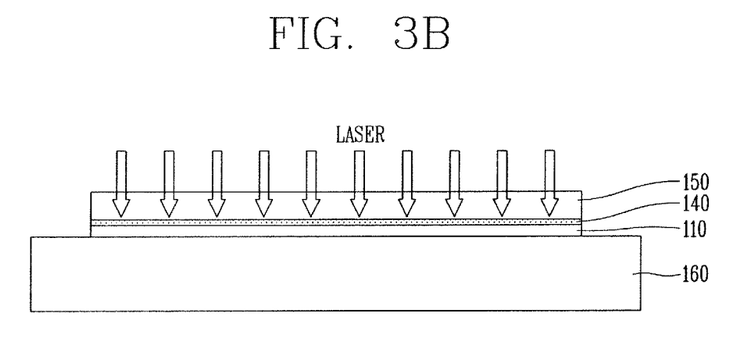

Afterwards, referring to FIG. 2E and FIG. 3B, lasers may be irradiated onto the auxiliary substrate 150 to remove the sacrifice layer 140 interposed between the flexible substrate 110 and the auxiliary substrate 150 (S106).

Figure 2F:
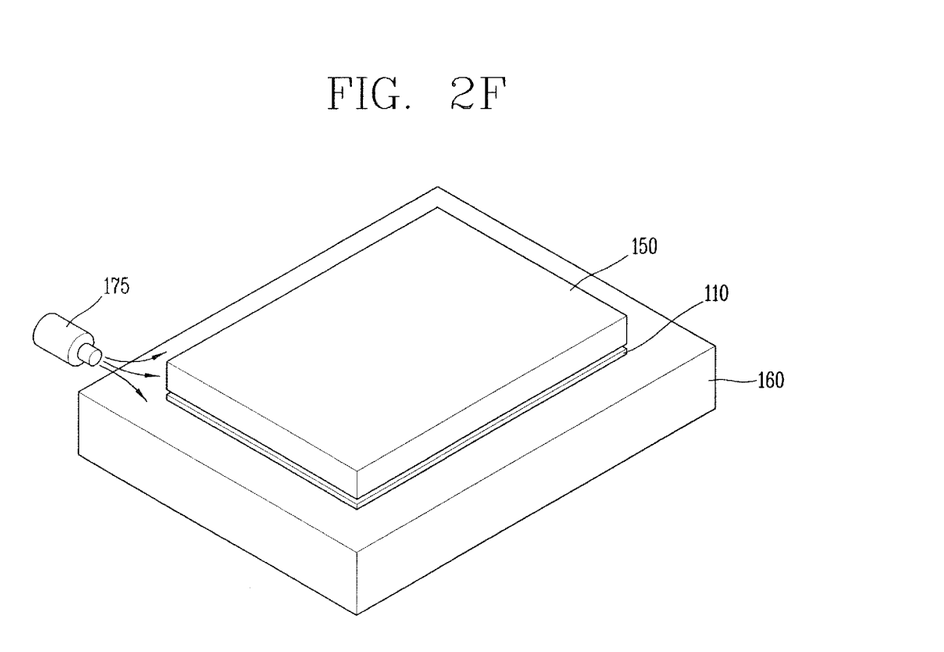
Figure 3C:
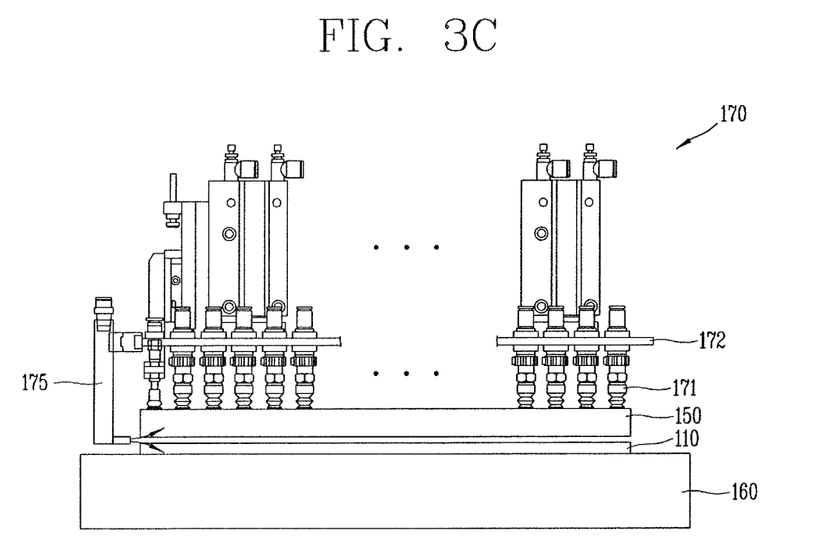

Referring to FIG. 2F and FIG. 3C, air may be injected between the flexible substrate 110 and the auxiliary substrate 150 from which the sacrifice layer 140 has been removed (S107).

Here, the air may be injected by, but not limited to, an injector 175 provided at a predetermined vacuum pad unit 170. The injector 175 may be provided, separate from the vacuum pad unit 170.

As such, on the loaded flexible substrate 110 and auxiliary substrate 150 may be installed the vacuum pad unit 170, which may include a plurality of vacuum pads 171 and a vacuum pad plate 172 to move those vacuum pads 171 up and down.

Here, the air injection may be carried out after the upper surface of the auxiliary substrate 150 is adsorbed and fixed using the vacuum pads 171 of the vacuum pad unit 170

With the air being injected, a vacuum adhesion force on the interface between the flexible substrate 110 and the auxiliary substrate 150 may be changed into pressure over atmospheric pressure, which may allow for smooth detachment of the auxiliary substrate 150. That is, an incomplete detachment of the auxiliary substrate 150, which has been caused due to a vacuum formed between the flexible substrate 110 and the auxiliary substrate 150 after irradiation of lasers upon detaching the auxiliary substrate 150, may be overcome as the vacuum is taken away by injecting air into the interface between the flexible substrate 110 and the auxiliary substrate 150.

Figure 2G:
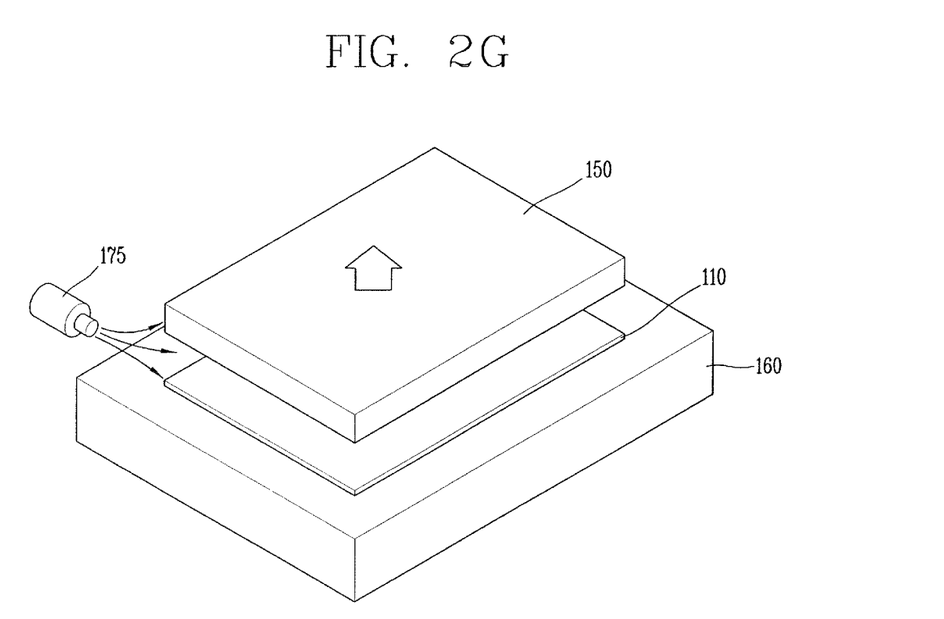
Figure 3D:
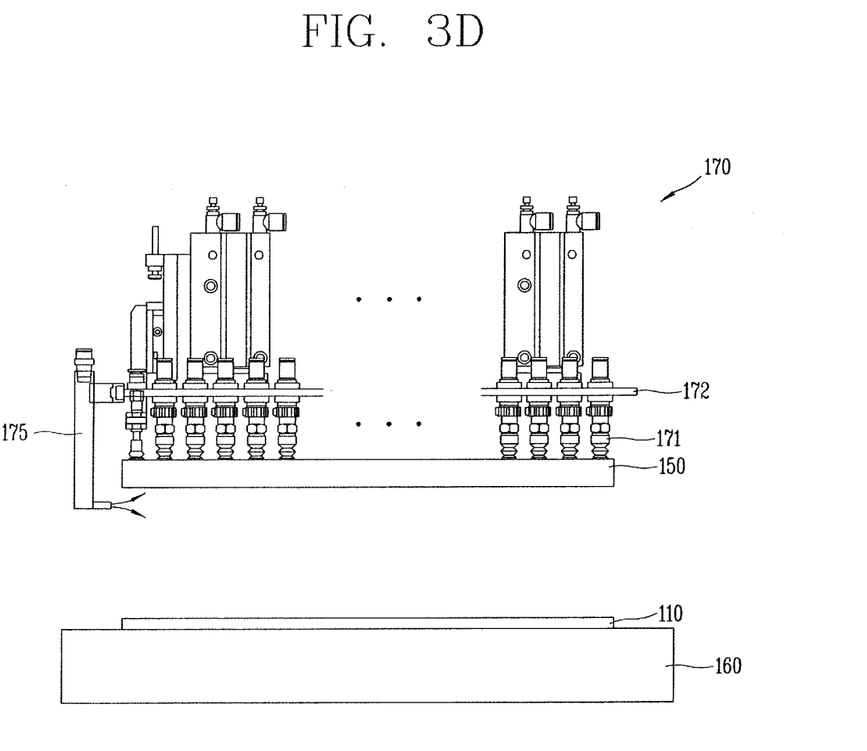

Afterwards, referring to FIG. 2G and FIG. 3D, in the state that the vacuum between the flexible substrate 110 and the auxiliary substrate 150 has been taken away, the auxiliary substrate 150 may be detached from the flexible substrate 110 using the vacuum pad unit 170 (S108).

Here, the auxiliary substrate 150 may be detached from the flexible substrate 110 by moving the vacuum pad unit 170 up and down with maintaining a horizontal state. However, the present disclosure may not be limited to this. The detachment of the auxiliary substrate 150 may be achieved using a lever by carrying out the detachment starting from one side of the auxiliary substrate 150.

Also, the air injection process may be continuously carried out during the detachment of the auxiliary substrate 150 from the flexible substrate 110.

Consequently, the laser irradiation and the detachment of the auxiliary substrate 150 may be executed on the same vacuum stage 160, but the present disclosure may not be limited to this.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of fabricating a flexible display device comprising:
providing an auxiliary substrate;
forming a sacrifice layer on the auxiliary substrate;
forming a flexible substrate on the auxiliary substrate with the sacrifice layer formed thereon;
forming a display panel on the flexible substrate;

removing the sacrifice layer interposed between the flexible substrate and the auxiliary substrate by way of a laser irradiation;

injecting air between the flexible substrate and the auxiliary substrate removed the sacrifice layer therebetween; and detaching the auxiliary substrate from the flexible substrate.

2. The method of claim 1, wherein the auxiliary substrate is implemented as a glass substrate or a metal substrate.

3. The method of claim 2, wherein the flexible substrate is formed by coating polyimide-based resin on the sacrifice layer.

4. The method of claim 3, wherein the display panel is implemented as one of a liquid crystal display (LCD) device, an organic light emitting diode (OLED) device or an electrophoresis display device.

5. The method of claim 1, further comprising after forming the display panel on the flexible substrate:

loading the flexible substrate onto a vacuum stage with the auxiliary substrate being turned over to face an upper side.

6. The method of claim 5, wherein the sacrifice layer interposed between the flexible substrate and the auxiliary substrate is removed by irradiating lasers onto the auxiliary substrate.

7. The method of claim 5, wherein the laser irradiation and the detachment of the auxiliary substrate are carried out on the same vacuum stage.

8. The method of claim 1, wherein the auxiliary substrate is detached from the flexible substrate using a vacuum pad unit.

9. The method of claim 8, wherein the vacuum pad unit comprises a plurality of vacuum pads and a vacuum pad plate to move the vacuum pads up and down.

10. The method of claim 9, wherein the air is injected through an air injector provided at the vacuum pad unit.

11. The method of claim 9, wherein the air injection is carried out after adsorbing and fixing an upper surface of the auxiliary substrate using the vacuum pads of the vacuum pad unit.

12. The method of claim 8, wherein the detachment of the auxiliary substrate is facilitated by injecting air to change a vacuum adhesion force of the interface between the flexible substrate and the auxiliary substrate into pressure over atmospheric pressure.

13. The method of claim 12, wherein the auxiliary substrate is detached from the flexible substrate using the vacuum pad unit after a vacuum between the flexible substrate and the auxiliary substrate is taken away by the air injection.

14. The method of claim 13, wherein the auxiliary substrate is detached from the flexible substrate by moving the vacuum pad unit upwardly with maintaining a horizontal state.

* * * * *